(12) United States Patent
Harrington

(10) Patent No.: US 8,914,720 B2
(45) Date of Patent: Dec. 16, 2014

(54) METHOD AND SYSTEM FOR CONSTRUCTING A DOCUMENT REDUNDANCY GRAPH

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1328 days.

(21) Appl. No.: 12/533,901

(22) Filed: Jul. 31, 2009

(65) Prior Publication Data

US 2011/0029952 A1 Feb. 3, 2011

(51) Int. Cl.
*G06F 17/00* (2006.01)
*G06F 17/30* (2006.01)
*G06F 17/22* (2006.01)

(52) U.S. Cl.
CPC ...... *G06F 17/2229* (2013.01); *G06F 17/30719* (2013.01); *G06F 17/2211* (2013.01)
USPC .......................................... 715/254; 715/204

(58) Field of Classification Search
CPC .................. G06F 17/30643; G06F 17/30719; G06F 17/30716
USPC .................................................. 715/254, 204
See application file for complete search history.

(56) References Cited

U.S. PATENT DOCUMENTS

| | | | | |
|---|---|---|---|---|
| 5,706,503 | A | 1/1998 | Poppen et al. | 395/611 |
| 5,873,081 | A * | 2/1999 | Harel | 1/1 |
| 6,515,666 | B1 | 2/2003 | Cohen | 345/440 |
| 7,096,420 | B1 | 8/2006 | Peikes | 715/513 |
| 7,549,309 | B2 | 6/2009 | Beringer et al. | 70/102 |
| 7,701,856 | B1 * | 4/2010 | Sankaran | 370/256 |
| 2002/0188598 | A1 * | 12/2002 | Myllymaki | 707/2 |
| 2004/0117448 | A1 * | 6/2004 | Newman et al. | 709/206 |
| 2005/0060287 | A1 * | 3/2005 | Hellman et al. | 707/2 |
| 2006/0053104 | A1 * | 3/2006 | Ferrari et al. | 707/3 |
| 2006/0271567 | A1 * | 11/2006 | Jain et al. | 707/100 |
| 2008/0086457 | A1 * | 4/2008 | Fei et al. | 707/3 |
| 2008/0154860 | A1 * | 6/2008 | Chen et al. | 707/3 |
| 2009/0024932 | A1 * | 1/2009 | Ryan et al. | 715/753 |
| 2009/0265330 | A1 * | 10/2009 | Cheng et al. | 707/5 |
| 2010/0088676 | A1 * | 4/2010 | Yuan et al. | 717/120 |
| 2010/0125572 | A1 * | 5/2010 | Poblete et al. | 707/722 |

OTHER PUBLICATIONS

J.F. Roddick, P. Fule; SemGrAM—Integrating Semantic Graphs into Association Rule Mining; School of Informatics and Engineering, Flinders University, 2007.
M.R. Mayberry, III, M. W. Crocker; Generating Semantic Graphs Through Self-Organization; Saarland University, 2004.
M.C. de Marneffe, T. Grenager, B. MacCartney, D. Cer, D. Ramage, C. Kiddon, C.D. Manning; Aligning Semantic Graphs for Textural Interence and Machine Reading, American Association for Artificial Intelligence, 2006.

* cited by examiner

*Primary Examiner* — Cesar Paula
*Assistant Examiner* — Howard Cortes
(74) *Attorney, Agent, or Firm* — Kermit D. Lopez; Luis M. Ortiz; Ortiz & Lopez, PLLC

(57) ABSTRACT

A system and method for constructing a document redundancy graph with respect to a document set. The redundancy graph can be constructed with a node for each paragraph associated with the document set such that each node in the redundancy graph represents a unique cluster of information. The nodes can be linked in an order with respect to the information provided in the document set and bundles of redundant information from the document set can be mapped to individual nodes. A data structure (e.g., a hash table) of a paragraph identifier associated with a probability value can be constructed for eliminating inconsistencies with respect to node redundancy. Additionally, a sequence of unique nodes can also be integrated into the graph construction process. The nodes can be connected to the paragraphs associated with the document set via a hyperlink and/or via a label with respect to each node.

18 Claims, 10 Drawing Sheets

METHOD AND SYSTEM FOR CONSTRUCTING A DOCUMENT REDUNDANCY GRAPH

TECHNICAL FIELD

Embodiments are generally related to data-processing systems and methods. Embodiments also relate in general to the field of computers and similar technologies and in particular to software utilized in this field. In addition, embodiments relate to document redundancy graphs.

BACKGROUND OF THE INVENTION

With the advent of the Internet and the World Wide Web, a vast amount of digital information is available over such networks. Information search and retrieval systems are utilized with respect to such networks to locate documents with largely redundant information in response to queries entered by a user. If the retrieved information is not a part of the data that is commonly shared, the user may be forced to examine a multitude of documents and wade through common material in a search of an uncommon fact. Further, if the information sought is available in multiple documents, then the user may not be able to select the optimal suite for presenting the material.

In an effort to address such problems, portions of the information that is shared by various members of the document set can be first determined. Such information can be utilized to present a document navigation aid that removes the redundant information so that the user may visit a topic once and then select the presentation of a topic based on document properties. Typical information redundancy systems can eliminate such redundant information from the document(s). Information redundancy systems can objectively measure duplication, locate duplicate content, eliminate extraneous content, and harmonize text variations within the document sets. Such information redundancy approaches can generally locate documents stored in an electronic media in response to the query entered by the user and provide multiple entry paths.

The majority of prior art approaches have adapted a visualization method that aids a user in navigating document sets. Such prior art approaches can provide an overview of the total information, the core information areas that are often repeated, and areas of specialized information unique to the document. Such prior art approaches, however, are typically applicable to identical pairs of paragraphs that appear to discuss the same topic across the document set, which leads to an inconsistent redundancy and is characterized by difficulties with respect to accuracy and evaluation.

Based on the foregoing, it is believed that a need exists for an improved method and system for constructing a document redundancy graph with respect to a document set. A need also exists for an improved method for eliminating redundant information and collapsing nodes to render the navigation of information more manageable, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for constructing a document redundancy graph with respect to a document set.

It is another aspect of the present invention to provide for an improved method for collapsing redundant nodes and unique node sequences with respect to the document set to rendering the navigation of information more manageable.

It is a further aspect of the present invention to provide for an improved method for visualizing a document set information.

The aforementioned aspects and other objectives and advantages can now be achieved as described herein. A system and method for constructing a document redundancy graph with respect to a document set is disclosed. The redundancy graph can be constructed with a node with respect to each paragraph associated with the document set such that each node in the redundancy graph represents a unique cluster of information. The nodes can be linked in an order with respect to the information provided in the document set and bundles of redundant information from the document set may be mapped to individual nodes. A data structure (e.g., a hash table) having a paragraph identifier associated with a probability value can be constructed to eliminate inconsistencies with respect to node redundancy. Additionally, a sequence of unique nodes can also be integrated into the graph construction process. The nodes can be connected to the paragraphs associated with the document set via a hyperlink and/or via a label with respect to each node.

The paragraphs associated with the document set can be provided with the unique paragraph identifier and the probability value to sort the matching paragraph into an order of decreasing certainty. The value of the data structure entry for the paragraph identifier represents a list of identifiers associated with the paragraphs that are reachable from that paragraph via combination. A determination can be made as to whether an intersection of the document set reachable from each node is empty. If the intersection is empty, the corresponding nodes can be combined into a single node. The data structure that describes the paragraph combinations can be updated when a pair of nodes is combined.

The sequence of unique paragraphs can be combined by comparing each paragraph identifier to the entries associated with the data structure in an order. If the table comprises the node, a flag can be set to indicate that the node is a combined node. If the node is not in the table, then the node can be unique to the document and can be part of a unique chain node. The flag can be checked to determine if the node follows a combined node; if so, the chain node can be started and the flag can be cleared. If the paragraph does not follow a combined node, then the paragraph must follow a chain node and the node can be added to the chain. The nodes of the graph comprise the combined nodes and the chain nodes and can be identified by the set of paragraphs they collect. An edge can be added to the graph for every transition from the chain node to the combined node and vice versa. The graph can be built by processing the edges and adding the nodes as required.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Documents reporting the same or related events and stories may contain substantial redundant information. The removal of such redundant information saves a user's time to acquire the information. The disclosed system and method can be utilized for constructing a document redundancy graph with respect to a document set such that each node in the graph represents a unique cluster of information. The methodology described herein consists of techniques for analyzing the paragraphs as well as a set of similarity criteria utilized to detect redundant paragraphs. Note that while the discussion herein refers to determining redundancy at the paragraph level, the disclosed method and/or system can be equally well applied to matching a finer level such as sentences or phrases, or alternatively may be used at a coarser level such as sections or documents. The following discussion is intended to provide a brief, general description of suitable computing environments in which the method and system may be implemented. Although not required, the method and system will be described in the general context of computer-executable instructions such as program modules, being executed by a single computer.

Generally, program modules include routines, programs, objects, components, data structures, etc., that perform particular tasks or implement particular abstract data types.

Moreover, those skilled in the art will appreciate that the method may be practiced with other computer system configurations, including hand-held devices, multi-processor systems, microprocessor-based or programmable consumer electronics, networked PCs, minicomputers, mainframe computers, and the like.

Figure 1:
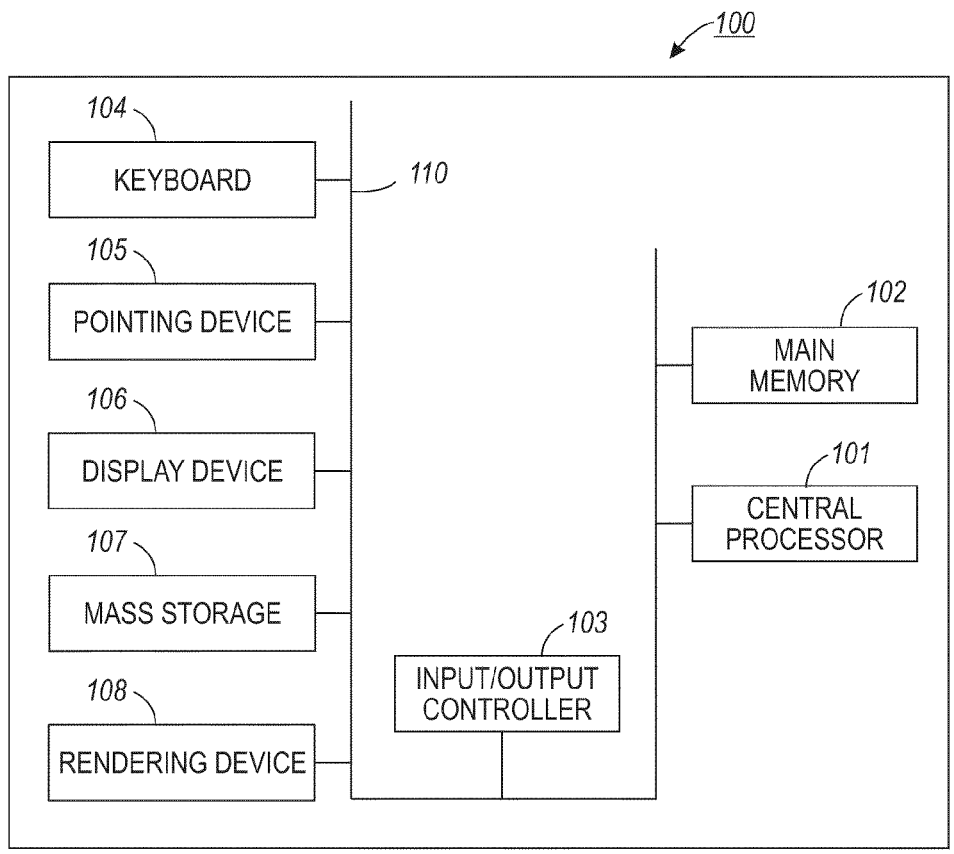
FIG. 1 illustrates a schematic view of a computer system in which the present invention may be embodied.
Figure 2:
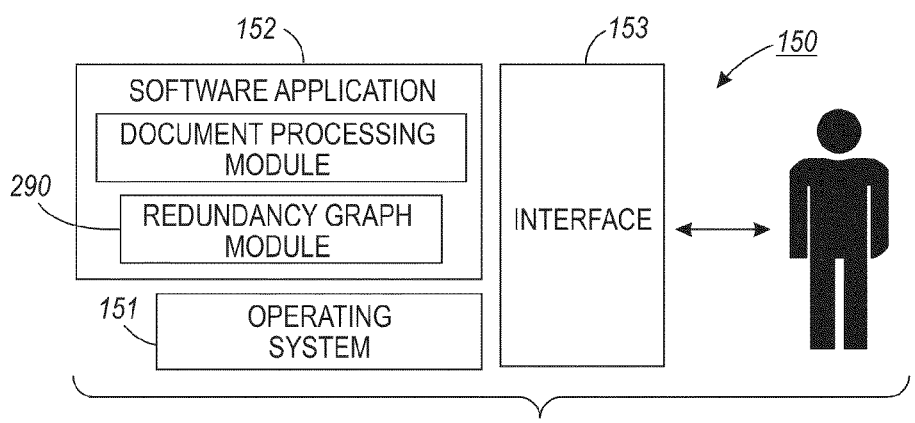
FIG. 2 illustrates a schematic view of a software system including an operating system, application software, and a user interface for carrying out the present invention.
Figure 3:
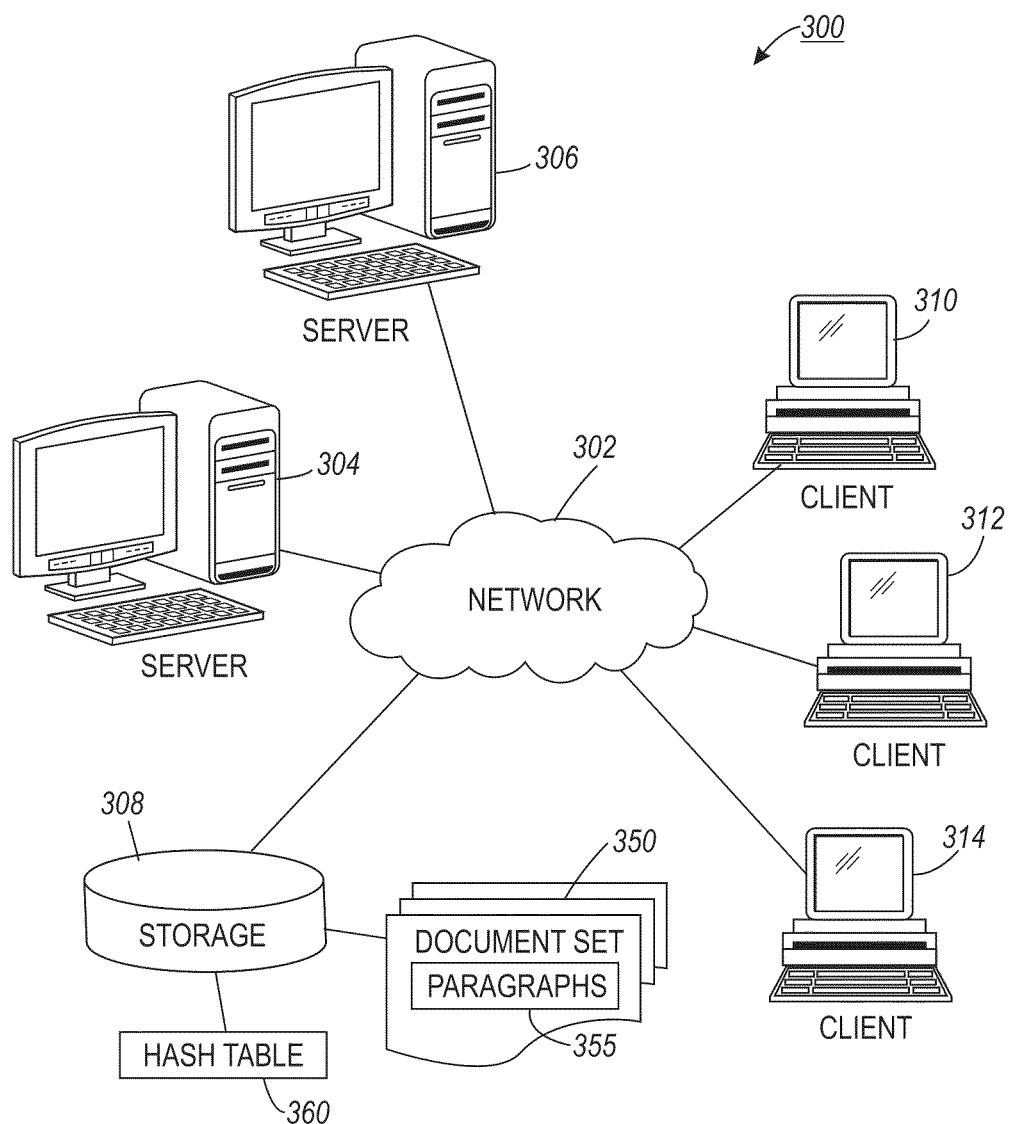
FIG. 3 illustrates a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. As illustrated, the various components of the data-processing apparatus 100 communicate through a system bus 110 or similar architecture. It can be appreciated that the data-processing apparatus 100 may be in some embodiments, a mobile computing device such as a Smartphone, a laptop computer, iPhone, etc. In other embodiments, data-processing apparatus 100 may function as a desktop computer, server, and the like, depending upon design considerations.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term "module" may also simply refer to an application such as a computer program design to assist in the performance of a specific task such as word processing, accounting, inventory management, etc.

The interface 153, which is preferably a graphical user interface (GUI), also serves to display results, whereupon the user may supply additional inputs or, for example, terminate a given session. In one embodiment, operating system 151 and interface 153 can be implemented in the context of a "Windows" system. It can be appreciated, of course, that other types of systems are possible. For example, rather than a traditional "Windows" system, other operating systems such as, for example, Linux may be employed with respect to operating system 151 and interface 153 in another embodiment. The document processing module 152 can include a module 290 for constructing a document redundancy graph.

Module 152 can be adapted for collapsing redundant nodes and unique node sequence with respect to the document set. Application module 152, on the other hand, can include instructions such as the various operations described herein with respect to the various components and modules described herein such as, for example, the method 400 and 700 depicted in FIG. 4 and FIG. 10.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communication links between various devices and computers connected together within network data processing system 100. Network 302 may include connections such as wire, wireless communication links, or fiber optic cables.

In the depicted example, servers 304 and 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations. In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers, which provide equivalent content. It should be appreciated that the computational tasks described herein may be carried out on multiple servers that communicate their data and results over a network 302. It should also be appreciated that the clients 310, 312 and/or 314 may provide an interface to the user for collecting input and presenting results and can additionally communicate tasks to the servers 304 and/or 306 over the network 302.

A document set 350 stored in the database 308 can be accessed by the end-user work stations 310, 312 and 314 in order to retrieve information related to a topic of interest. The document set 350 can be stored in an electronic form in the database 308, can include graphic or other information displays derived from separate computer programs and exported into a computer word processor program, and stored as a single computer file in word processor format. The document set 350 may also be distributed over multiple storage locations and is accessible via a network (e.g., web pages accessible via the Internet and World Wide Web). The database 308 may store information regarding the documents of the document set in addition to, or instead of, storing the documents themselves. Many documents are functionally linked to other documents that deal with a particular business or academic function and can be referred to as document sets. The document set 350 can include a number of paragraphs 355 associated with redundancy information.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
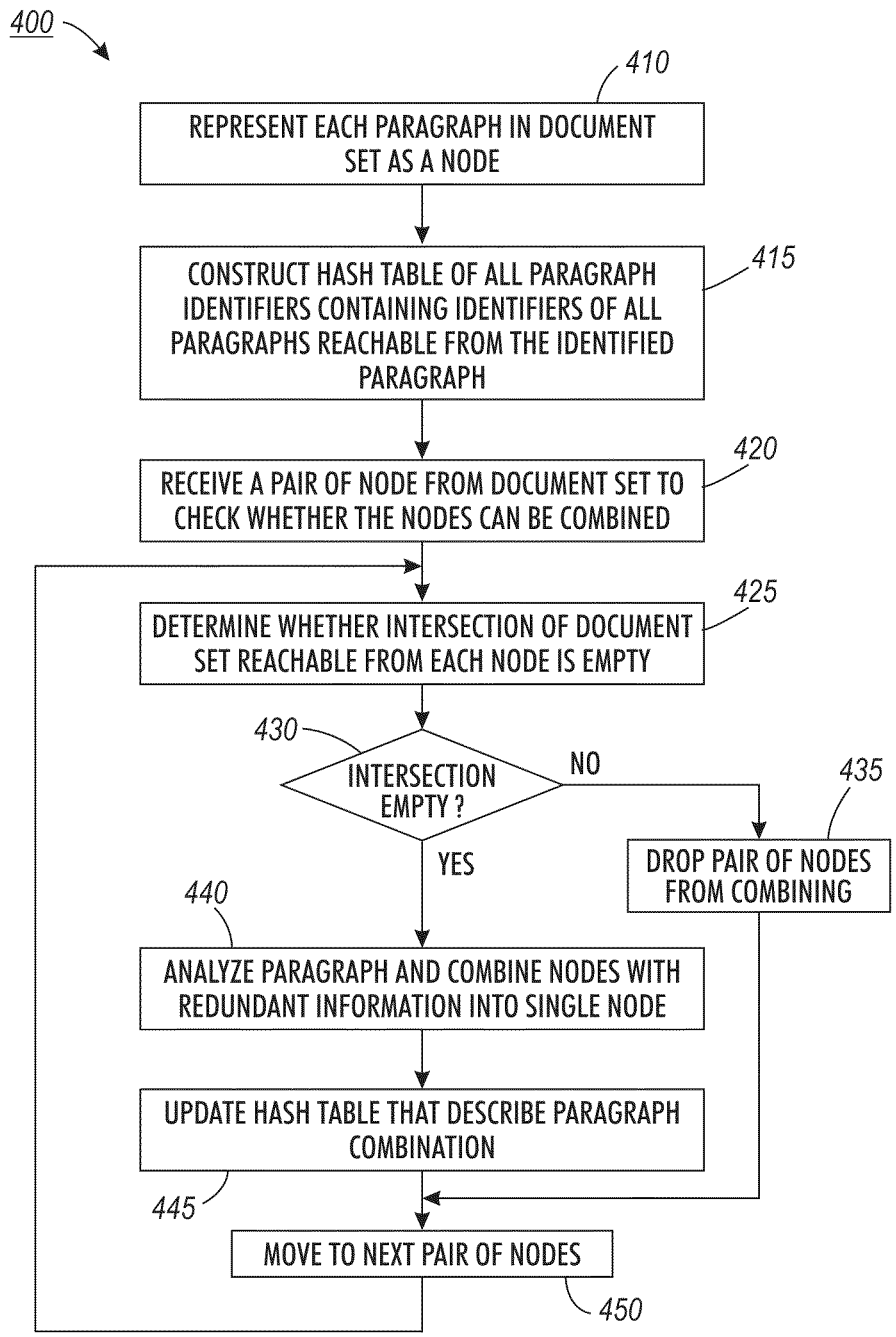
FIG. 4 illustrates a flow chart of operation illustrating logical operational steps of a method for combining nodes associated with redundant information in a document redundancy graph, in accordance with an embodiment.

FIG. 4 illustrates a flow chart of operation illustrating logical operational steps of a method 400 for constructing a document redundancy graph, in accordance with an embodiment. Note that in FIGS. 1-12, identical or similar parts are generally indicated by identical reference numerals. The method 400 effectively eliminates redundant information associated with the document set 350 by constructing a document redundancy graph and provides an optimal solution for document set accessing. Each paragraph associated with the document set 350 can be represented as a node, as depicted at block 410.

Figure 5:
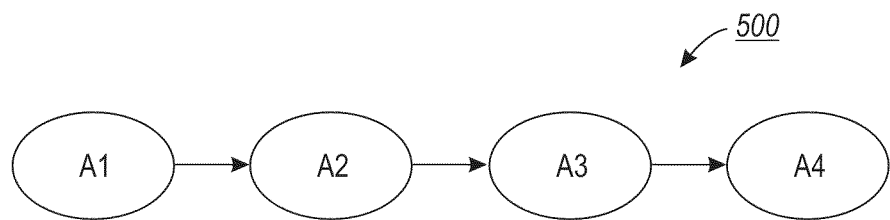
FIG. 5 illustrates a graphical representation illustrating a document as a series of paragraph nodes, in accordance with an embodiment.

FIG. 5 illustrates a graphical representation illustrating a document 500 as a series of paragraph nodes, in accordance with an embodiment. The paragraph associated with the document 500 can be represented as a series of paragraph nodes such as paragraph nodes A1, A2, A3, and A4. Each node can include a unique cluster of information related to the paragraph associated with the document 500. The nodes A1, A2, A3, and A4 can be linked to each other based on sequence of paragraph list in the document 500.

Figure 6:
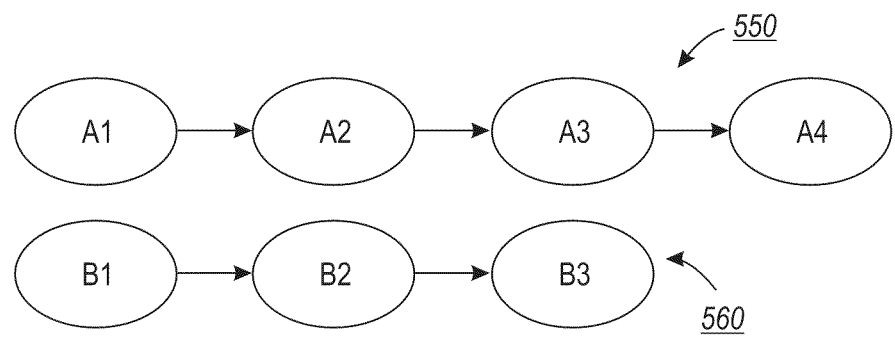
FIG. 6 illustrates a graphical representation illustrating multiple documents as a series of paragraph nodes, in accordance with an embodiment.
Figure 7:
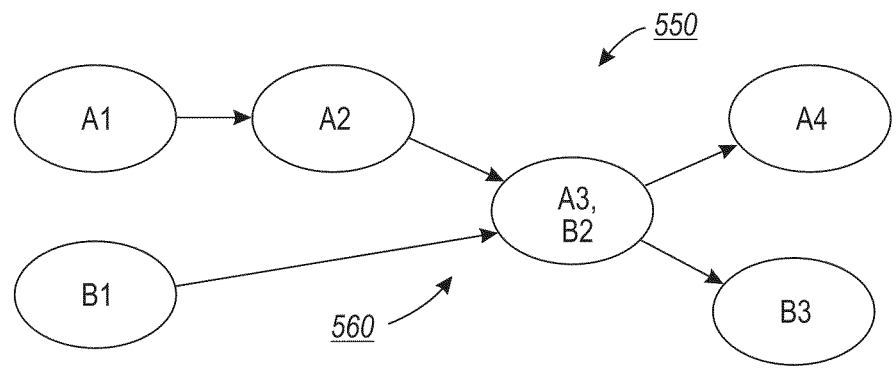
FIG. 7 illustrates a graphical representation illustrating merged nodes with redundant information, in accordance with an embodiment.

FIG. 6 illustrates a graphical representation illustrating multiple documents 550 and 560 as a series of paragraph nodes, in accordance with an embodiment. The document set 550 can be represented as a set of nodes such as A1, A2, A3, A4 and the document set 560 can be represented as a set of nodes B1, B2 and B3. For example, consider the paragraph B2 associated with the document 560 possess the same information as that of the paragraph A3 associated with the document 550. The paragraphs B2 and A3 can be combined into a single node, as illustrated in FIG. 7. For example, consider a paragraph A2 that overlaps with B3, C4 overlaps with A4, and B3 overlaps with C4, but if the nodes are combined all together then A2 must be combined A4, however, A2 and A4 are different, as shown in FIG. 8.

The overlap of information between the paragraphs can be determined utilizing a paragraph identifier for the paragraphs and a probability value associated with each paragraph pair. The probability value is a measure of the degree of certainty of common content. The value can be utilized to sort the paragraph matches into an order of decreasing certainty. Thus a first pair possesses a great likelihood of common content and is the best candidate for merging nodes. A data structure 360 (e.g., a hash table) of all the paragraphs identifiers associated with the probability value can be constructed to check for inconsistencies, as indicated at block 415. The value of the table entry for the paragraph identifier is a list of the identifiers of paragraphs that are reachable from that paragraph via a combination. A pair of nodes can be received in an order from the document set 350 to check whether the nodes can be combined, as depicted at block 420.

A determination can be made whether the intersection of the sets of documents 350 reachable from each node is empty, as illustrated at block 425. If the intersection is not empty, then either the two nodes have already been combined through transitive operations, or else combining the nodes can create an inconsistency. Hence, the paragraph pair can be dropped from combining, as depicted at block 435. Thereafter, the next pair of nodes can be considered for merging, as indicated at block 450. If the intersection is empty, the paragraph can be analyzed and the nodes with redundant information can be combined into single node, as illustrated at block 440. The data structure 360 that describes paragraph combination can then be updated, as depicted at block 445.

Figure 8:
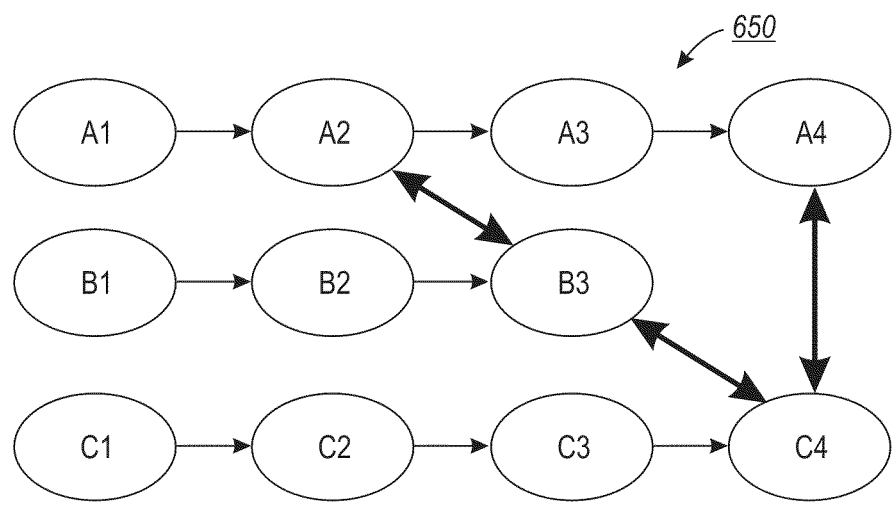
FIG. 8 illustrates a graphical representation illustrating a process for combining nodes with an overlapping content, in accordance with an embodiment.

FIG. 8 illustrates a graphical representation 650 illustrating a process for combining nodes with an overlapping content, in accordance with an embodiment. For example, consider the paragraph pairing (A2, B3), (A4, C4) and (B3, C4) as illustrated in FIG. 8. The first pair (A2, B3) in the data structure 360 can be expressed as follows:

$$\{A2:[A2,B3],B3:[B3,A2]\} \quad (1)$$

Similarly, for the second pair (A4, C4) no entries for A4 or C4 can be found and the data structure 360 can be represented as follows:

$$\{A2:[A2,B3],B3:[B3,A2],A4:[A4,C4],C4:[C4,A4]\} \quad (2)$$

When combining the third pair (B3, C4), there is an entry for B3 and the set of documents reachable for B3 contains B and A. Further, there is an entry for C4 and the documents reachable from C4 contains C and A. Since the intersection of these two sets can contain A which is not empty, the third pair (B3, C4) cannot be combined. When the pair of nodes is combined, the data structure 360 that describes the paragraph combinations can be updated. The data structure 360 can be checked whether the table 360 has an entry for each of the two nodes to be combined, and if not, an entry (an empty list for saving paragraph identifiers) can be created. (Alternatively, initial entries can be made for all nodes where the entries have only the nodes themselves as values; that is, initially, the only node reachable from a given node is that node itself.) Then, for each node reachable from the first paragraph identifier, the list of paragraphs reachable from the second paragraph identifier can be merged. Similarly, for the list of paragraphs reachable from the second paragraph identifier, the list of paragraphs reachable from the first paragraph identifier can be merged.

Figure 9:
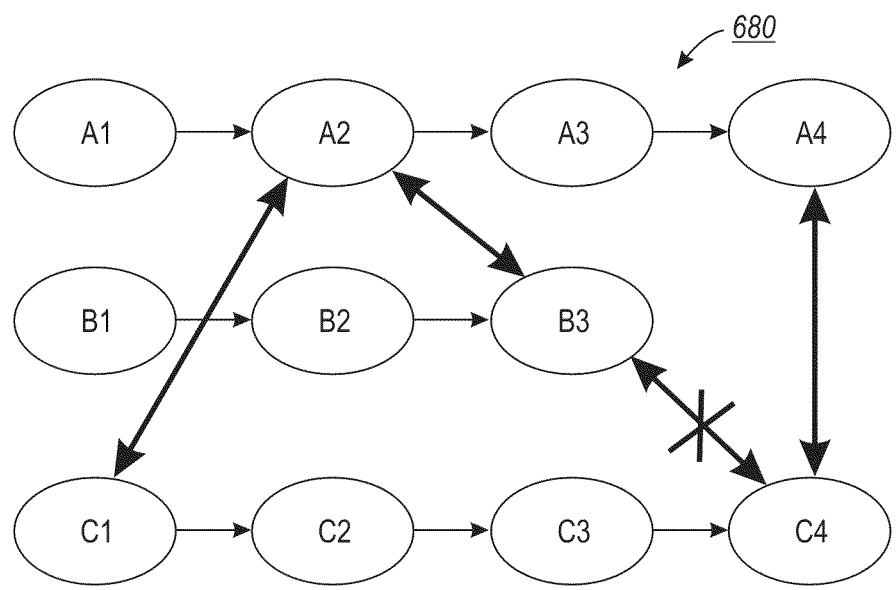
FIG. 9 illustrates a graphical representation illustrating a process for combining multiple node sequences in the document set, in accordance with an embodiment.

FIG. 9 illustrates a graphical representation 680 illustrating a process for combining multiple node sequences in the document set, in accordance with an embodiment. For example, consider the list of paragraph pairs (A2, B3), (A4, C4), (B3, C4) and (A2, C1). The first three pairs can be described as above which yields a paragraph combination table as follows.

$$\{A2:[A2,B3],B3:[B3,A2],A4:[A4,C4],C4:[C4,A4]\} \quad (3)$$

The fourth pair (A2, C1) can then be processed and the check for inconsistency indicates that the documents A and B are reachable from A2, but no documents are reachable from C1 hence a combination can be made. A list entry for C1 can be written as follows:

$$\{A2:[A2,B3],B3:[B3,A2],A4:[A4,C4],C4:[C4,A4],\\C1:[C1]\} \quad (4)$$

Thereafter, C1 and the paragraph reachable from C1 to A2 and the paragraph reachable from A2 to B3 can be added as follows.

$$\{A2:[A2,B3,C1],B3:[B3,A2,C1],A4:[A4,C4],C4:[C4,\\A4],C1:[C1]\} \quad (5)$$

Similarly, A2 and the paragraph reachable from A2 to C1 can be added as follows:

$$\{A2:[A2,B3,C1],B3:[B3,A2,C1],A4:[A4,C4],C4:[C4,\\A4],C1:[C1,A2,B3]\} \quad (6)$$

Figure 10:
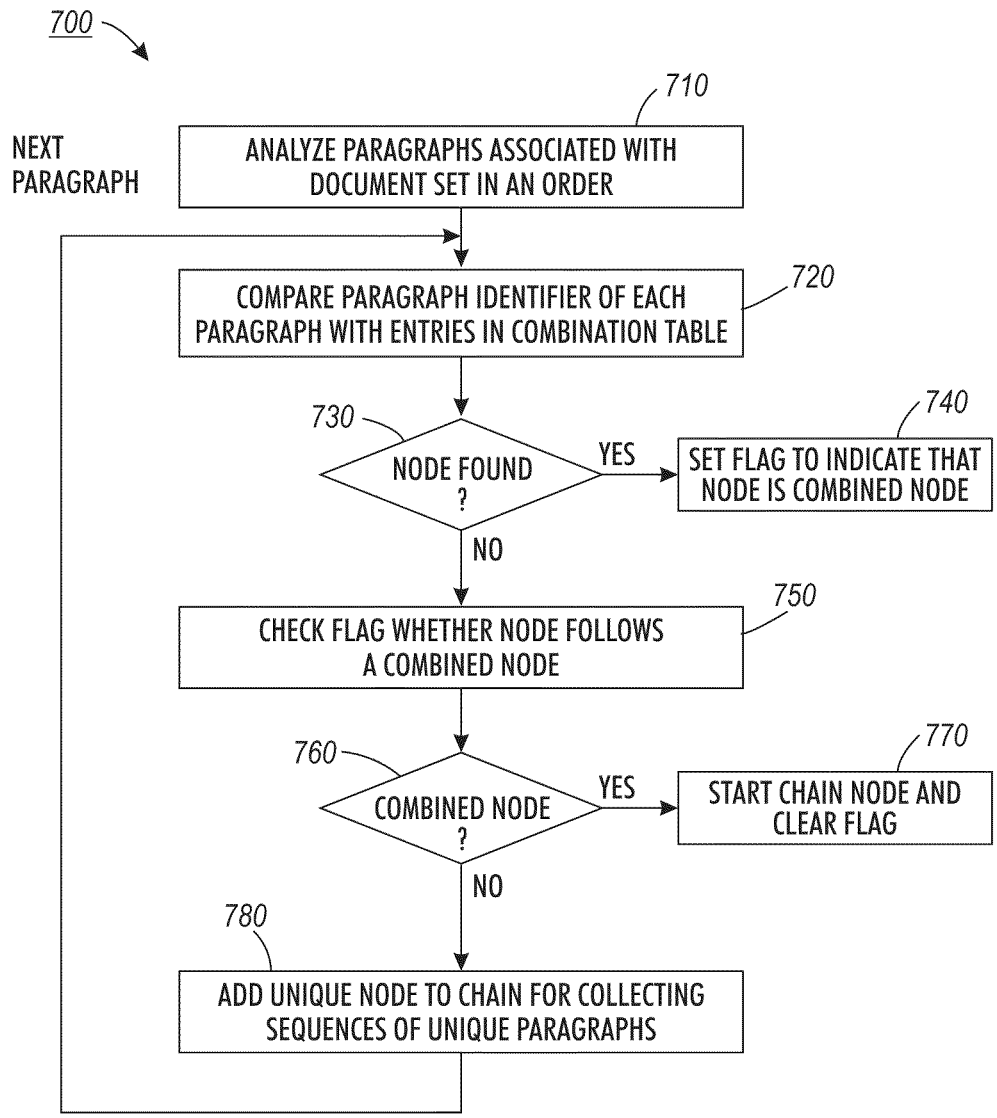
FIG. 10 illustrates a flow chart of operation illustrating logical operational steps of a method for combining unique node sequence in the document redundancy graph, in accordance with an embodiment.

Such an approach maintains the table of node combinations. FIG. 10 illustrates a flow chart of operations illustrating logical operational steps of a method 700 for combining unique sequences in the document redundancy graph, in accordance with an embodiment. The paragraphs associated with the document set 350 can be analyzed in an order, as illustrated at block 710. The paragraph identifier associated with each paragraph can be compared with the entries of the data structure 360, as depicted at block 720. A determination can be made whether the node corresponding to the paragraph identifier is found in the entries of the data structure 360, as shown at block 730.

If the node is found in the data structure 360, a flag can be set to indicate the node as a combined node, as illustrated at block 740. Otherwise, the flag associated with the node can be checked whether the following node is the combined node, as depicted at block 750. Thereafter, a determination can be made whether the following node is the combined node, as shown at block 760. If the following node is the combined node, a chain node can be started and the flag can be cleared, as illustrated at block 770. Otherwise, the unique node is added to the chain for collecting the sequences of the unique paragraphs, as depicted at block 780. The method of collecting sequences of unique paragraphs can be integrated into the graph construction process.

Figure 11:
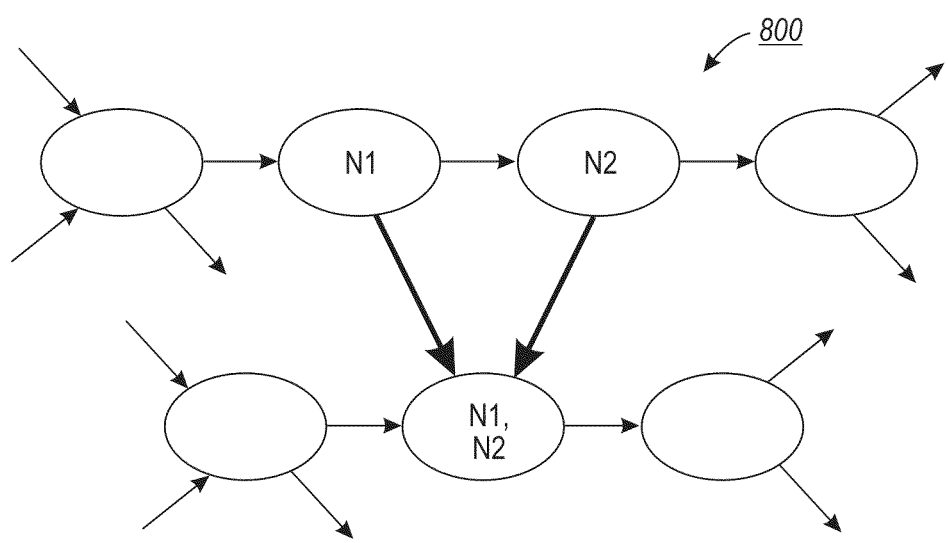
FIG. 11 illustrates a graphical representation illustrating a process for merging chained nodes, in accordance with an embodiment.

FIG. 11 illustrates a graphical representation 800 illustrating a process for merging chained nodes, in accordance with an embodiment. The nodes of the graph can be identified by the set of paragraphs they collect. The nodes of the graph comprise the combined nodes and the chain nodes. The paragraphs associated with each document can be analyzed to construct the graph edges and for each paragraph the node can be determined. For every transition from the chain node to the combined node or from the combined node to the chain node, or from the combined node to a different combined node (not previously considered) an edge to the graph can be added. The graph can be built by processing the edges and adding the nodes as required. Note that in other embodiments, the graph can contain chains of combined nodes. This may occur, for example, when the same document appears more than once in the document set. The node sequences can be identified where the nodes have only a single in-edge and out-edge and the nodes can be merged in order to compact the graphs.

Figure 12:
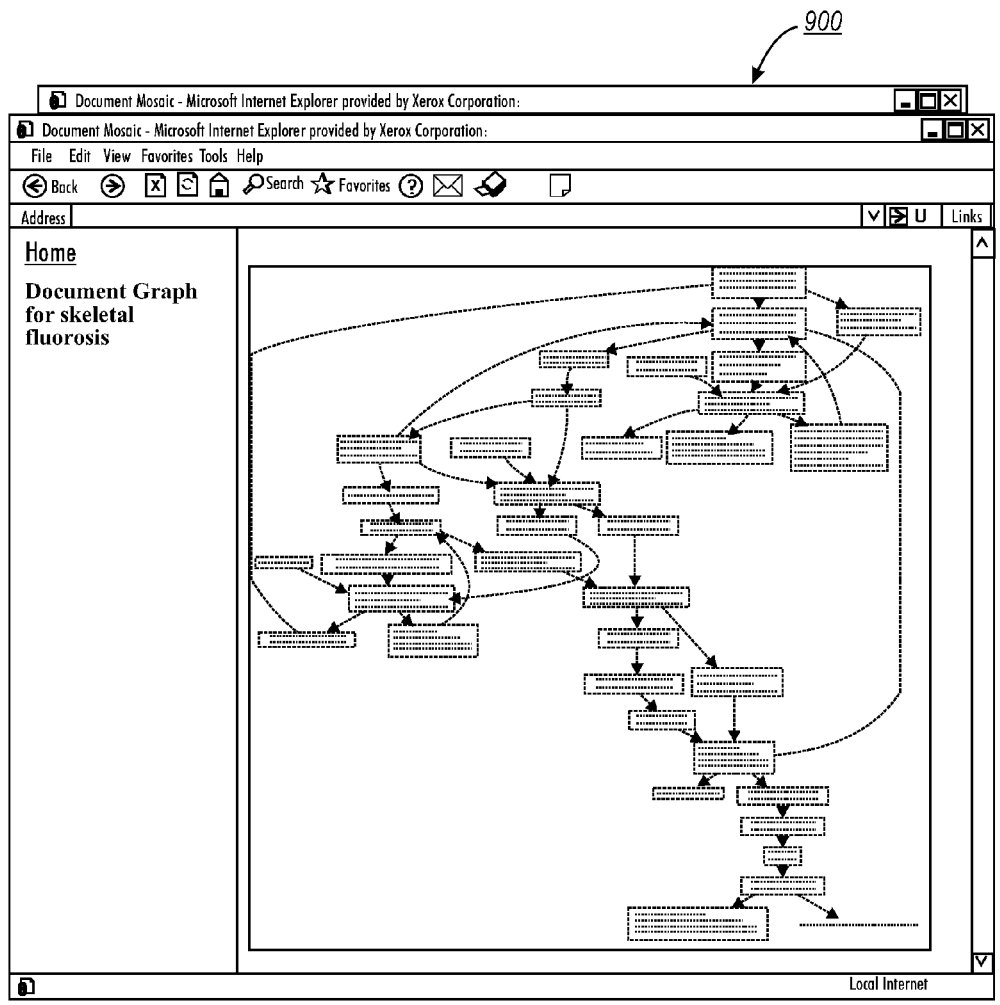
FIGS. 12-13 illustrate a GUI of an exemplary document redundancy graph, in accordance with an embodiment.
Figure 13:
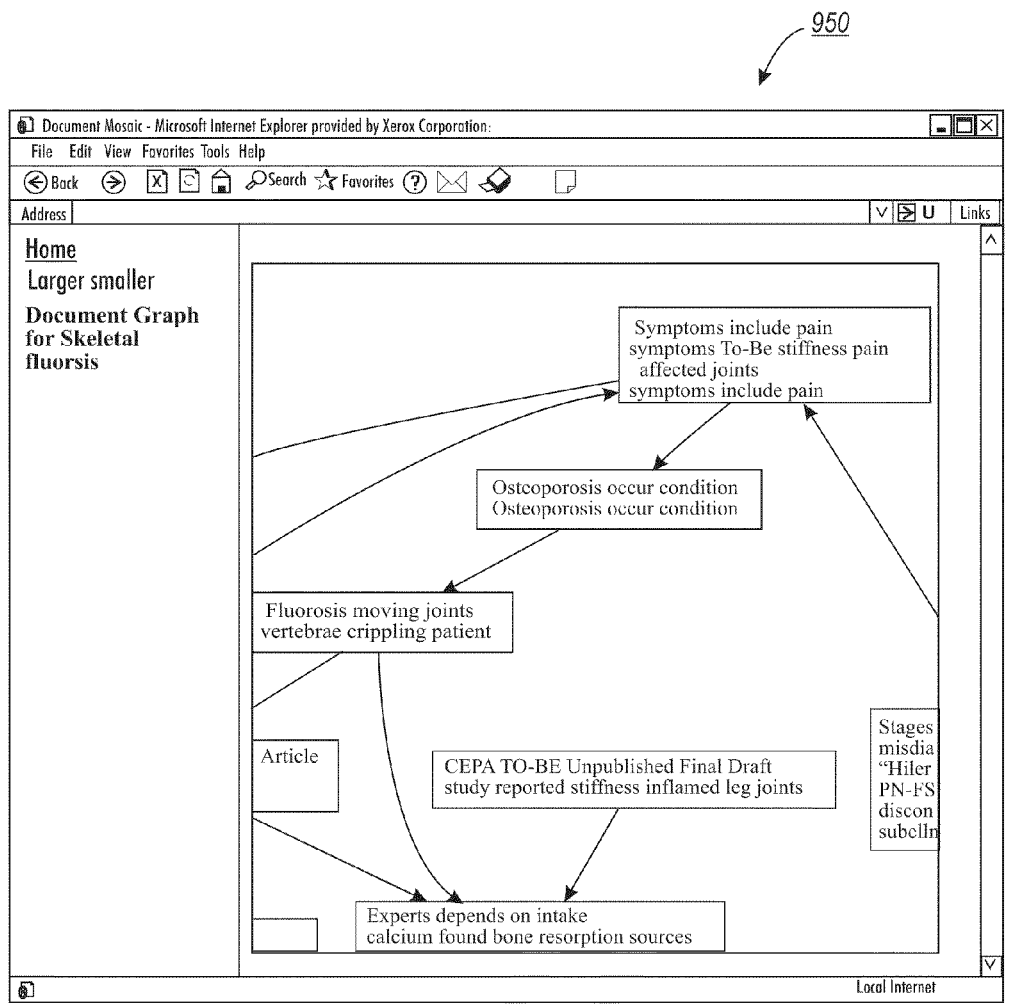

FIGS. 12-13 respectively illustrate a GUI 900 and a GUI 950 that provide exemplary document redundancy graph(s), in accordance with an embodiment. The nodes of the graph(s) and the paragraphs can be connected utilizing a set of hyperlinks such that when a node of a graph is clicked, the list of paragraphs is presented leading to access to the paragraphs themselves. The nodes to the paragraphs can also be connected via labels in the nodes. The labels may comprise cryptic paragraph identifiers to summaries or to full paragraph content, depending upon the space required to allocate to the graph and the nodes. It is believed that by utilizing the approach described herein, redundant information can be eliminated and nodes can be collapsed to make navigation of information more manageable.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for constructing a document redundancy graph, said method comprising:
   representing each paragraph associated with a document set as a node among a plurality of nodes, wherein each node among said plurality of nodes with respect to said redundancy graph represents a unique cluster of information related to said each paragraph;
   providing said each paragraph with a unique paragraph identifier;
   constructing a hash table of all paragraph identifiers comprising identifiers of all paragraphs reachable from said each paragraph;
   merging said plurality of nodes associated with redundant information by configuring said hash table with respect to a pair of paragraph identifiers in association with a probability value, wherein said probability value sorts a plurality of information matches in an order of decreasing certainty of common content, wherein a pair of said paragraph identifiers associated with an increased certainty of common content are selected to merge; and
   combining said plurality of nodes unique to a single document by expressing a pair of nodes with overlapping common content as a combined node, wherein said combined node comprises an empty intersection of said pair of nodes and comparing each paragraph identifier among said pair of paragraph identifiers to a probability value associated with an entry in said hash table in an order wherein said hash table eliminates inconsistency associated with said plurality of information matches.

2. The method of claim 1 further comprising configuring at least one paragraph identifier among said pair of paragraph identifiers to include a list of identifiers associated with at least one information element.

3. The method of claim 1 wherein merging said plurality of nodes associated with said redundant information further comprises:
   combining said plurality of nodes into a single node if an intersection of said document set reachable from each node is empty.

4. The method of claim 1 wherein merging said plurality of nodes associated with said redundant information further comprises:
   updating said hash table that describes information combinations after combining a pair of nodes.

5. The method of claim 1 wherein combining said plurality of nodes unique to said single document further comprises:
   setting a flag to indicate said node is a combined node if said hash table comprises said node.

6. The method of claim 1 wherein combining said plurality of nodes unique to said single document further comprises:
   initiating a chain node if said node follows said combined node by checking said flag in order to thereafter clear said flag.

7. The method of claim 6 wherein combining said plurality of nodes unique to said single document further comprises:
   adding said node to said chain node if said paragraph does not follow said combined node.

8. The method of claim 6 further comprising adding an edge to said redundant graph for every transition from said chain node to said combined node and vice versa.

9. The method of claim 1 further comprising linking said plurality of nodes with respect to said at least one paragraph via a hyperlink.

10. The method of claim 1 further comprising linking said plurality of nodes with respect to said at least one paragraph via a label.

11. The method of claim 10 wherein said label comprises at least one of the following types of data:
    a cryptic paragraph identifier;
    a summary associated with said paragraph; or
    a paragraph content.

12. A system for constructing a document redundancy graph, said system comprising:
    a processor;
    a data bus coupled to said processor; and
    a computer-usable mass storage device embodying computer code, said computer-usable medium being coupled to said data bus, said computer program code comprising instructions executable by said processor and configured for:
    representing each paragraph associated with a document set as a node among a plurality of nodes, wherein each node among said plurality of nodes with respect to said redundancy graph represents a unique cluster of information related to said each paragraph;
    providing said each paragraph with a unique paragraph identifier;
    constructing a hash table of all paragraph identifiers comprising identifiers of all paragraphs reachable from said each paragraph;
    merging said plurality of nodes associated with redundant information by configuring said hash table with respect to a pair of paragraph identifiers in association with a probability value, wherein said probability value sorts a plurality of information matches in an order of decreasing certainty of common content, wherein a pair of said paragraph identifiers associated with an increased certainty of common content are selected to merge; and
    combining said plurality of nodes unique to a single document by expressing a pair of nodes with overlapping common content as a combined node, wherein said combined node comprises an empty intersection of said pair of nodes and comparing each paragraph identifier among said pair of paragraph identifiers to a probability value associated with an entry in said hash table in an order wherein said hash table eliminates inconsistency associated with said plurality of information matches.

13. The system of claim 12 wherein said instructions are further configured for modifying at least one paragraph identifier among said pair of paragraph identifiers to include a list of identifiers associated with at least one information element.

14. The system of claim 12 wherein said instructions are further configured for adding an edge to said redundant graph for every transition from said chain node to said combined node and vice versa.

15. The system of claim 12 wherein said instructions are further configured for linking said plurality of nodes with respect to said at least one paragraph via a hyperlink.

16. The system of claim 12 wherein said instructions are further configured for linking said plurality of nodes with respect to said at least one paragraph via a label.

17. The system of claim 16 wherein said label comprises at least one of the following types of data:
   a cryptic paragraph identifier;
   a summary associated with said paragraph; or
   a paragraph content.

18. A computer-usable mass storage for constructing a document redundancy graph, said computer-usable mass storage storing computer program code, said computer program code comprising program instructions executable by a processor, said program instructions comprising:
   program instructions to represent each paragraph associated with a document set as a node among a plurality of nodes, wherein each node among said plurality of nodes with respect to said redundancy graph represents a unique cluster of information related to said each paragraph;
   program instructions to provide said each paragraph with a unique paragraph identifier;
   program instructions to construct a hash table of all paragraph identifiers comprising identifiers of all paragraphs reachable from said each paragraph;
   program instructions to merge said plurality of nodes associated with redundant information by configuring said hash table with respect to a pair of paragraph identifiers in association with a probability value, wherein said probability value sorts a plurality of information matches in an order of decreasing certainty of common content, wherein a pair of said paragraph identifiers associated with an increased certainty of common content are selected to merge; and
   program instructions to combine said plurality of nodes unique to a single document by expressing a pair of nodes with overlapping common content as a combined node, wherein said combined node comprises an empty intersection of said pair of nodes and comparing each paragraph identifier among said pair of paragraph identifiers to a probability value associated with an entry in said hash table in an order wherein said hash table eliminates inconsistency associated with said plurality of information matches.

* * * * *